Patented June 2, 1936

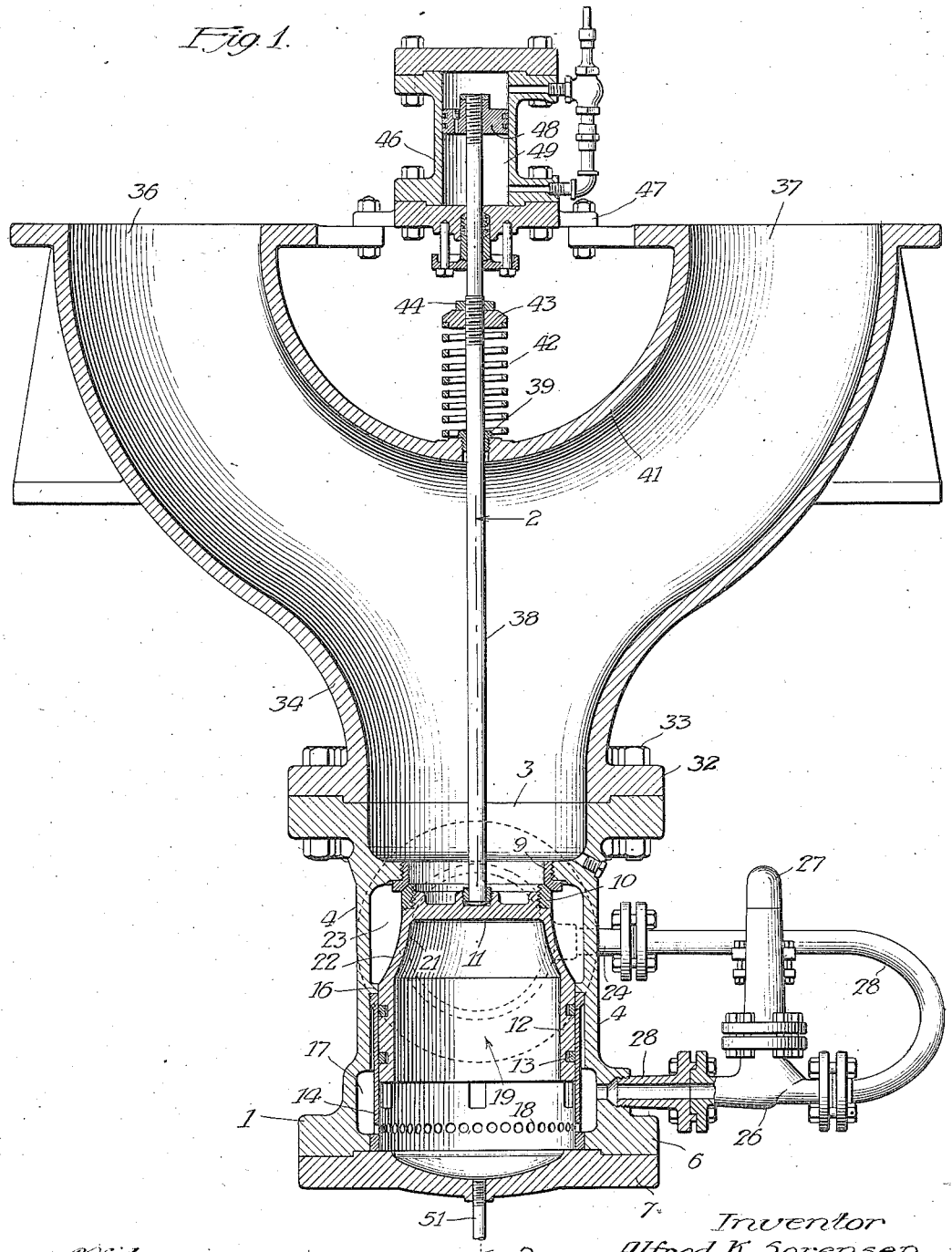

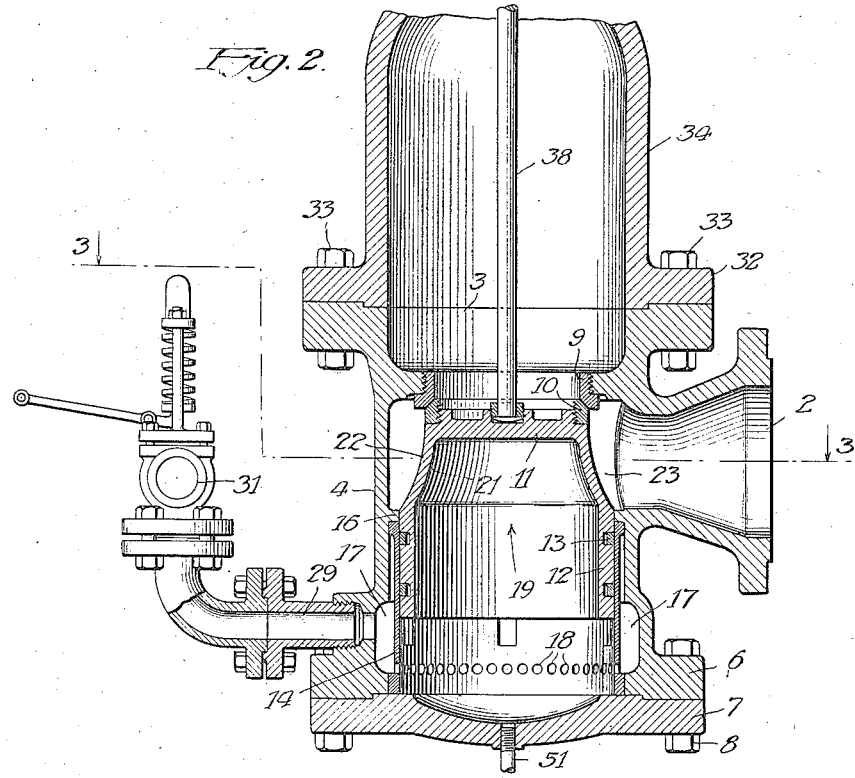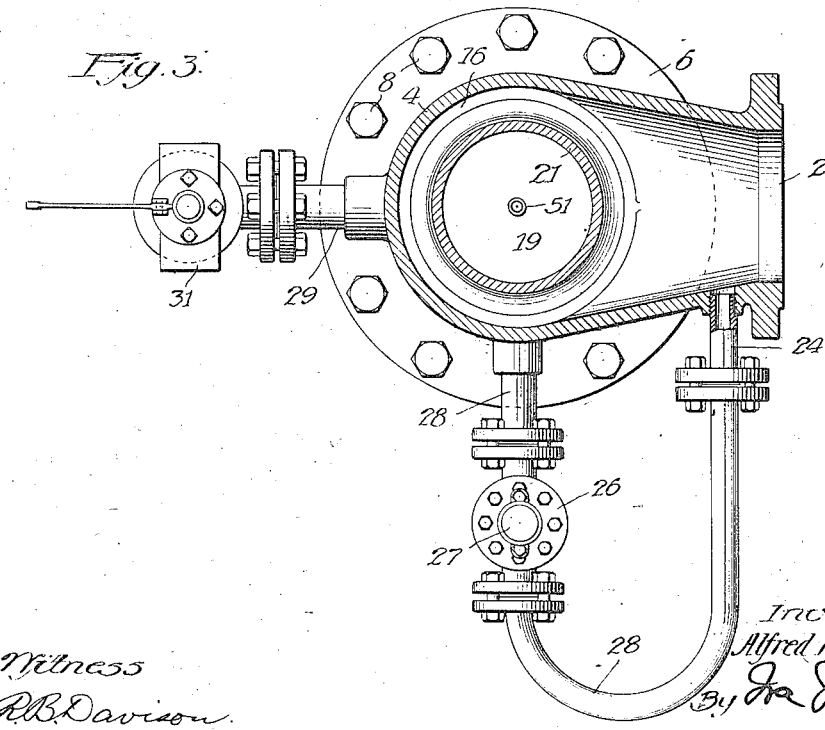

2,043,203

UNITED STATES PATENT OFFICE 2,043,203

FULL AREA SAFETY VALVE

Alfred K. Sorensen, Chicago, Ill., assignor to Crane Co., Chicago, Ill., a corporation of Illinois Application July 31, 1929, Serial No. 382,298

4 Claims. (Cl. 137—53)

This invention relates to an improved safety valve of the pilot-controlled type.

Among other objects, the invention is intended to provide a practicable and efficient safety valve which will give a full area discharge, i. e. a discharge of cross sectional area equivalent to the full area of the opening in the valve seat, and which will operate with substantially the same certainty and precision as a standard pop safety valve.

A further object is to provide a practicable, efficient and reliable safety valve of large discharge capacity for use as an emergency relief valve in connection with a high pressure steam boiler of large capacity, or for the purpose of providing adequate relief capacity for any pressure system of large capacity.

The invention is practically adapted for embodiment in valves of unlimited large sizes and discharge capacities. Such a valve may be used in place of a gang of ordinary safety valves to provide adequate relief capacity to protect the boilers of a power plant from sudden accumulation of an enormous surplus of steam at high pressure in event of accident or emergency causing sudden release of the power from the load or the shutting off of the power from the machinery operated thereby.

An illustrated embodiment of the invention is shown in the accompanying drawings in which:

Fig. 1 is a vertical section through the center of a complete valve constructed in accordance with this invention, Fig. 2 is a vertical section through the lower portion of a valve taken on a plane perpendicular to that of Fig. 1, and Fig. 3 is a section partially in section taken on the line 3—3 of Fig. 2.

In the illustrated embodiment of this invention the valve proper consists of a body indicated generally by reference numeral 1 having a side inlet 2, an outlet 3 and a cylindrical portion 4 the lower end of which is flanged as at 6 and closed by a cap 7 secured thereto by means of bolts 8. The inlet 2 and outlet 3 may also be flanged as illustrated to receive suitable complementary connecting fittings. The outlet orifice is threaded to receive a seat member 9 adapted to be engaged and closed by the seating ring 10 threadedly secured to the head end 11 of a piston-like main valve the skirt portion 12 of which is fitted with sealing rings 13 bearing against a sleeve 14 fitted within the cylindrical portion 4 and abutting against shoulder 16 to form a tight cylinder within the cylindrical portion 4 of the valve body 1. The length of the skirt portion 12 and the cylindrical portion 4 of the body of the valve are so proportioned that the piston valve is capable of sufficient reciprocatory motion to give a full opening of the valve seat 9. The lower portion of valve body 1 is formed with an annular recess 17 providing a chamber between the sleeve 14 and the body 1. The lower end of sleeve 14 is provided with openings 18 establishing communication between chamber 17 and the interior of the piston valve. The upper end of the piston valve is reduced in diameter as at 21 to provide a concaved outer surface 22 creating an annular chamber 23 between the reduced end of the piston and the inner wall of the cylindrical portion 4 of body 1 which chamber is in direct communication with the inlet 2.

Connected to the inlet 2 is a by-pass connection 24 leading to a throttle valve 26 of standard construction having, however, a cap 27 thereon to prevent unauthorized adjustment of the valve. The outlet of the throttle valve connects with chamber 17 by means of pipe 28, thus connecting inlet 2 with the interior of the piston valve through openings 18. It is apparent that the inlet is in communication with the concaved surface 22 of the piston valve as well as the interior of the piston valve.

The chamber 17 is also provided with a connection 29 leading to a pilot safety valve 31. The pressure in chamber 17 and the region 19 of the interior of the piston valve is thus controlled by means of the relatively small pilot valve 31 which, by controlling the pressure against the interior of the valve, controls the action of the main valve. This pilot valve may be of any standard construction capable of giving a specific quantity of discharge with a suitable blow-back.

In order to give an unrestricted discharge, a duplex discharge connection is secured to the flange of the outlet 3 by means of a complementary flange 32 and bolts 33. The discharge connection in the illustrated embodiment is in the form of a Y, but may be in any convenient form to suit the installation, the stem 34 thereof terminating in flange 32 and the outlets 36 and 37 extending upwardly and constituting duplex discharge openings giving a substantially unrestricted discharge passage from the outlet end of the main valve to the atmosphere. As an additional guiding means for the main valve in its reciprocating movements there is provided a valve rod 38 secured at one end to the head of the valve and projecting through a bushing 39 secured in a web 41 which joins the upper ends of the outlets of the Y. To normally keep the valve in a closed position against the action of gravity, a compression spring 42 surrounds rod 38 and is placed under compression between the outer surface of web 41 and a spring cap 43 threadedly engaging rod 38 and locked into adjusted position by means of nut 44. In order to cushion the movements of the valve there is provided the usual dashpot mechanism 46, which mechanism however need not necessarily be provided for the efficient operation of the valve. The dash 48 is carried upon the outer end of rod 38 and fits within a dashpot chamber 49. The remainder of the dashpot construction is well known and need not be further described. The cap 7 is provided with the usual drainage connection 51 with the customary valve (not shown).

In operation the inlet 2 is connected to the apparatus to be controlled by the valve. The fluid from the apparatus enters the inlet 2 and chamber 23 and acts upon surface 22. At the same time fluid passes through connection 24 and throttle valve 26, and enters the chamber 17, passing through openings 18 into the chamber 19 of the piston valve acting upon the inner surface of the head 11 and tending to positively close the piston valve upon the seat 9. The interior of the piston valve and chamber 17 is also open to the pilot valve connection 29 and the pilot valve 31.

After the pressure, for which pilot 31 is set, is reached, the pilot valve 31 will open and thereby reduce the pressure in chamber 17 and the interior 19 of the main valve, thus unbalancing the piston valve and permitting the pressure in the supply line which still acts upon surface 22 to open the main valve. In view of the fact that the pressure tending to close the valve is substantially reduced, the piston valve will open to its full extent, thus giving a full area opening and permitting the excess pressure to pass off unrestricted. From the outlet end of the main valve the fluid passes upwardly through both branches 36 and 37 into the atmosphere. After the pressure has been reduced to the predetermined value the pilot valve 31 will close and allow the pressure to build up in chamber 17 and the interior 19 of the main valve, thus positively overbalancing the pressure against the relatively smaller exterior surface 22 of the main valve and positively closing the valve. The action of the main valve may be controlled and regulated within certain limits by means of the dashpot 46 in the customary manner.

The throttle valve 26 may be regulated to control the flow of fluid through the by-pass and thereby control the time period necessary to build up pressure in chamber 17 and the interior 19 of the main valve. In this manner the closing of the main valve may be closely regulated to suit any desired and particular conditions. By means of the dashpot and the throttle valve, the lift and blowback of the entire valve assembly may be adjusted and regulated within close limits to substantially any desired conditions.

It is also pointed out that a valve of the type illustrated has a full area opening, the area of said opening being 100% of the area of the seat opening, whereas in valves of ordinary construction the lift rarely exceeds 10% of the diameter and only in exceptional cases reaches 25% of the diameter. It is believed to be apparent, therefore, that there is provided a full area opening valve which is capable of discharging relatively large quantities of fluid in a relatively short period of time and which may be adjusted and controlled to suit many and various conditions.

It is obvious that many changes may be made in the details of construction of the embodiment of this invention which is given for illustrative purposes only without departing from the spirit and scope of the invention as defined in the appended claims.

I claim:

1. A safety valve comprising a body having an inlet and an outlet thereto and being further provided with a valve cylinder therein, a valve seat between said cylinder and said outlet, a hollow differential piston valve mounted for reciprocating movement in said cylinder and having a seating end adapted to engage and close said valve seat, said piston valve being further provided with a reduced portion adjacent its seating end and forming a chamber between the piston and the cylinder wall upon the inlet side of said seat, said chamber being in communication with said inlet, a by-pass from said inlet to the interior of said piston valve subjecting the interior thereof to the inlet pressure, the interior piston area subject to the inlet pressure being greater than the exterior piston area subject to the inlet pressure, an exhaust passage in communication with the interior of said piston valve, and a normally closed pilot safety valve in said exhaust passage subject to the pressure therein and operable to open at a predetermined upper limit of said pressure and to close upon reduction of said pressure to a predetermined lower limit, said exhaust passage discharging to the atmosphere independently of the exhaust through said body, whereby the action of said pilot safety valve is uninfluenced by the pressure in the outlet of said body, said pilot valve being disassociated from said by-pass and controlling only the exhaust passage to the atmosphere, there being constant communication through said by-pass between said inlet and the interior of the piston valve.

2. A safety valve comprising a cylinder, a differential piston valve therein, an inlet passage for connection with a source of fluid under pressure communicating with said cylinder through a lateral opening of large area adjacent to one end of the cylinder, said cylinder having in said end an outlet opening of large area and a surrounding valve seat on which the piston valve seats, the other end of the cylinder being closed, the proportions of the parts being such as to permit a sufficient movement of said piston valve from its seat to provide a large area discharge capacity, said piston valve being formed to provide when closed an effective front piston area exposed to the pressure in said inlet passage, which effective front area is less than the effective rear piston area, a relatively restricted by-pass passage constantly establishing communication between said inlet passage and the interior of the cylinder at the rear side of the piston valve, whereby said piston valve is normally held closed by the pressure action on its rear side, and means controlled by the pressure behind the piston valve for effecting when said pressure reaches a predetermined limit a rapid release thereof sufficiently to cause the full opening of said piston valve by the pressure action on its front area and for discontinuing the pressure-releasing action when said pressure behind the piston valve falls to a predetermined limit below that at which said piston valve opens, said means comprising an exhaust passage in communication with the closed end of the cylinder and a normally closed pilot safety valve of determined discharge capacity and blow-off controlling said exhaust passage and controlled by said pressure behind the piston valve to open at said predetermined upper pressure limit and to close at said predetermined lower pressure limit for reestablishing the condition for creating sufficient pressure behind the piston valve to close it, whereby said piston valve is controlled by the pilot valve to open in response to a predetermined inlet pressure and to close in response to a predetermined reduction of such pressure.

3. A safety valve comprising a cylinder, a pressure differential piston valve therein, an inlet passage for connection with a source of fluid under pressure communicating with said cylinder through a lateral opening of large area adjacent to one end of the cylinder, said cylinder having in said end an outlet opening of large area and a surrounding valve seat on which the piston valve seats, the other end of the cylinder being closed, the proportions of the parts being such as to permit a sufficient movement of said piston valve from its seat to provide a large area discharge capacity, said piston valve being so shaped as to provide when closed a pressure chamber between it and the outlet end of the cylinder in communication with said inlet passage, whereby the piston valve when closed is subjected to pressure acting in a direction to open it upon an effective piston area substantially less than the full piston area, means comprising a by-pass having an adjustable orifice control establishing communication through a relatively restricted passage between said inlet passage and closed end of the cylinder, whereby the piston valve is subjected to a pressure on its full area in a direction to hold it closed, an exhaust passage independent of control by said orifice control in communication with the closed end of the cylinder, and a normally closed pilot safety valve in said exhaust passage subject to the pressure therein and operable to open at a predetermined upper limit of said pressure and to close upon reduction of said pressure to a predetermined lower limit below that at which the main piston valve will open, said by-pass passage being independent of control by said pilot valve, whereby said piston valve is controlled by the pilot valve to open in response to a predetermined inlet pressure and to close in response to a predetermined reduction of said pressure.

4. A safety valve comprising a cylinder, a pressure differential piston valve therein, an inlet passage for connection with a source of fluid under pressure communicating with said cylinder through a lateral opening of large area adjacent to one end of the cylinder, said cylinder having in said end an outlet opening of large area and a surrounding valve seat on which the piston valve seats, the other end of the cylinder being closed, the proportions of the parts being such as to permit a sufficient movement of said piston valve from its seat to provide a full area discharge capacity, said piston valve being so shaped as to provide when closed a pressure chamber between it and the outlet end of the cylinder in communication with said inlet passage, whereby the piston valve when closed is subjected to pressure acting in a direction to open it upon an effective piston area substantially less than the full piston area, means comprising a by-pass having an adjustable orifice control establishing communication through a relatively restricted passage between said inlet passage and closed end of the cylinder, whereby the piston valve is subjected to a pressure on its full area in a direction to hold it closed, an exhaust passage independent of control by said orifice control in communication with the closed end of the cylinder, and a normally closed pilot valve in said exhaust passage subject to the pressure therein and operable to open at a predetermined upper limit of said pressure and to close upon reduction of said pressure to a predetermined lower limit below that at which the main piston valve will open, said by-pass passage being independent of control by said pilot valve, whereby said piston valve is controlled by the pilot valve to open in response to a predetermined inlet pressure and to close in response to a predetermined reduction of said pressure.

ALFRED K. SORENSEN.